March 26, 1968  C. R. WERN ETAL  3,374,947
SLIDE RULE

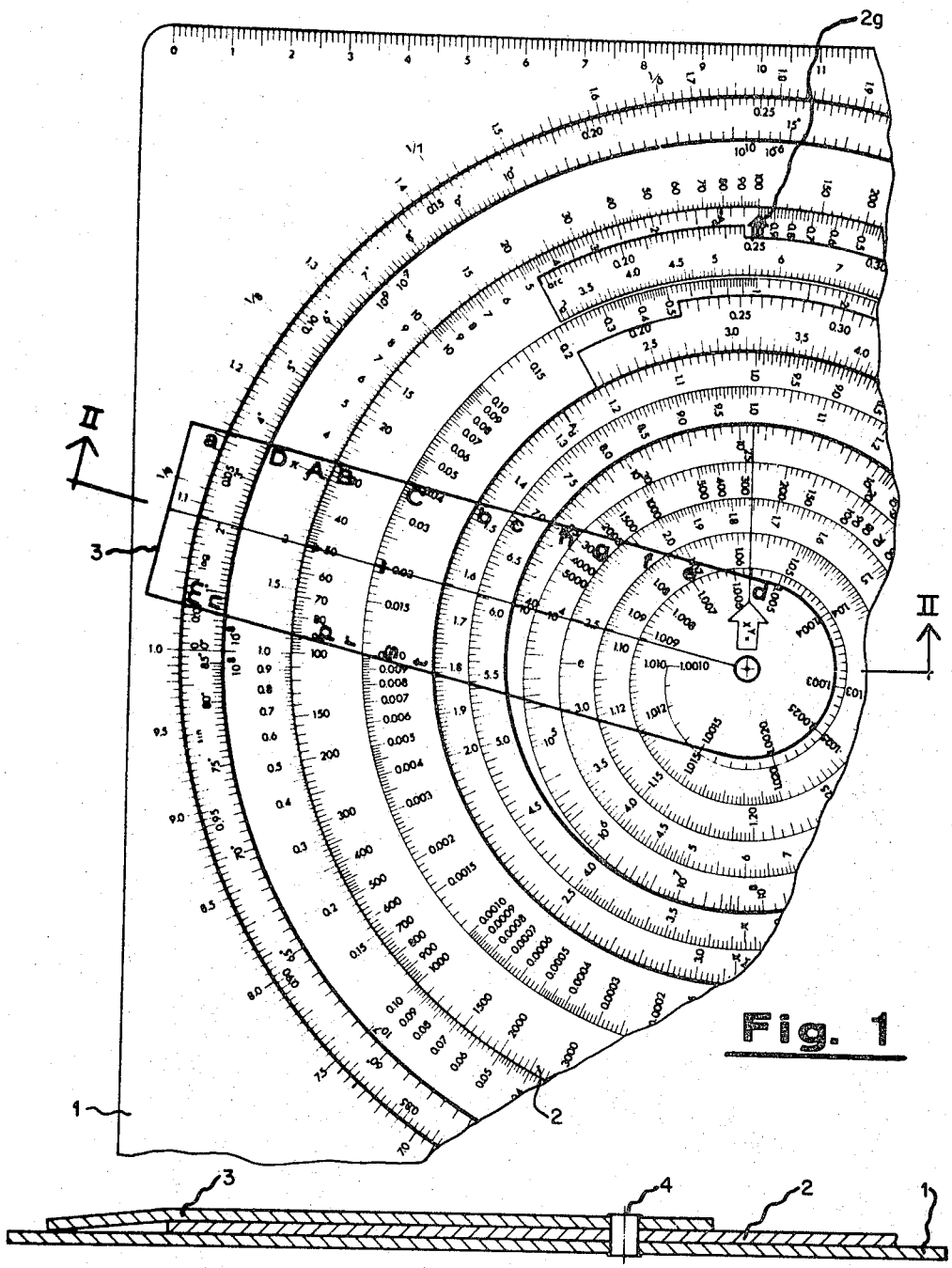

Filed May 13, 1966  3 Sheets-Sheet 3

INVENTORS
CARL RUNE WERN
GEORGE HERMAN WERN
LARS ÅKE WERN
by *Strauch, Nolan, Neale, Nies & Kurz*
ATTORNEYS

3,374,947
SLIDE RULE

Carl Rune Wern, George Herman Wern, and Lars Åke Wern, all of Vartavagen 59, Stockholm, Sweden
Filed May 13, 1966, Ser. No. 549,882
Claims priority, application Sweden, May 20, 1965, 6,568/65; Aug. 20, 1965, 10,922/65; Mar. 11, 1966, 3,213/66
7 Claims. (Cl. 235—84)

ABSTRACT OF THE DISCLOSURE

A slide rule device including a base plate and a circular slide and runner rotatable relative to the base and to each other about an axis through the center of the base plate. Provision is made for so solving multiplication and division problems and exponential and other equations and of providing powers and roots as to simultaneously provide both the sequence of digits in the answer and the correct location of the decimal point. Also, provision may be made for computing logarithms and ascertaining sine, tangent, and arc values of angles, areas of circles having a specified radii or diameters, and reciprocals of numbers as well as other functions.

---

The present invention relates to a slide rule of the circular type.

The main object of the invention is to provide a slide rule by which a single multiplication or a single division can be set up to appear exactly as when printed in the conventional way, for example 0.03·500,000 respectively 30:500.

Another object of the invention is to provide a slide rule by which the solutions of the problems are obtained not only with the correct digits but also with the correct magnitudes.

A third object of the invention is to provide a slide rule which is very easy to learn to operate.

A fourth object of the invention is to provide a slide rule which according to the principles of human engineering is convenient to handle and which has such dimensions that it is convenient to carry in a briefcase.

Other objects of the invention will be apparent from the description below.

The accompanying drawings illustrate embodiments of the invention:

FIGURE 1 is a front view of the slide rule according to the invention.

FIGURE 2 is a cross section of the slide rule according to FIGURE 1 along the line II—II as viewed in the direction of the arrows.

Figure 3:
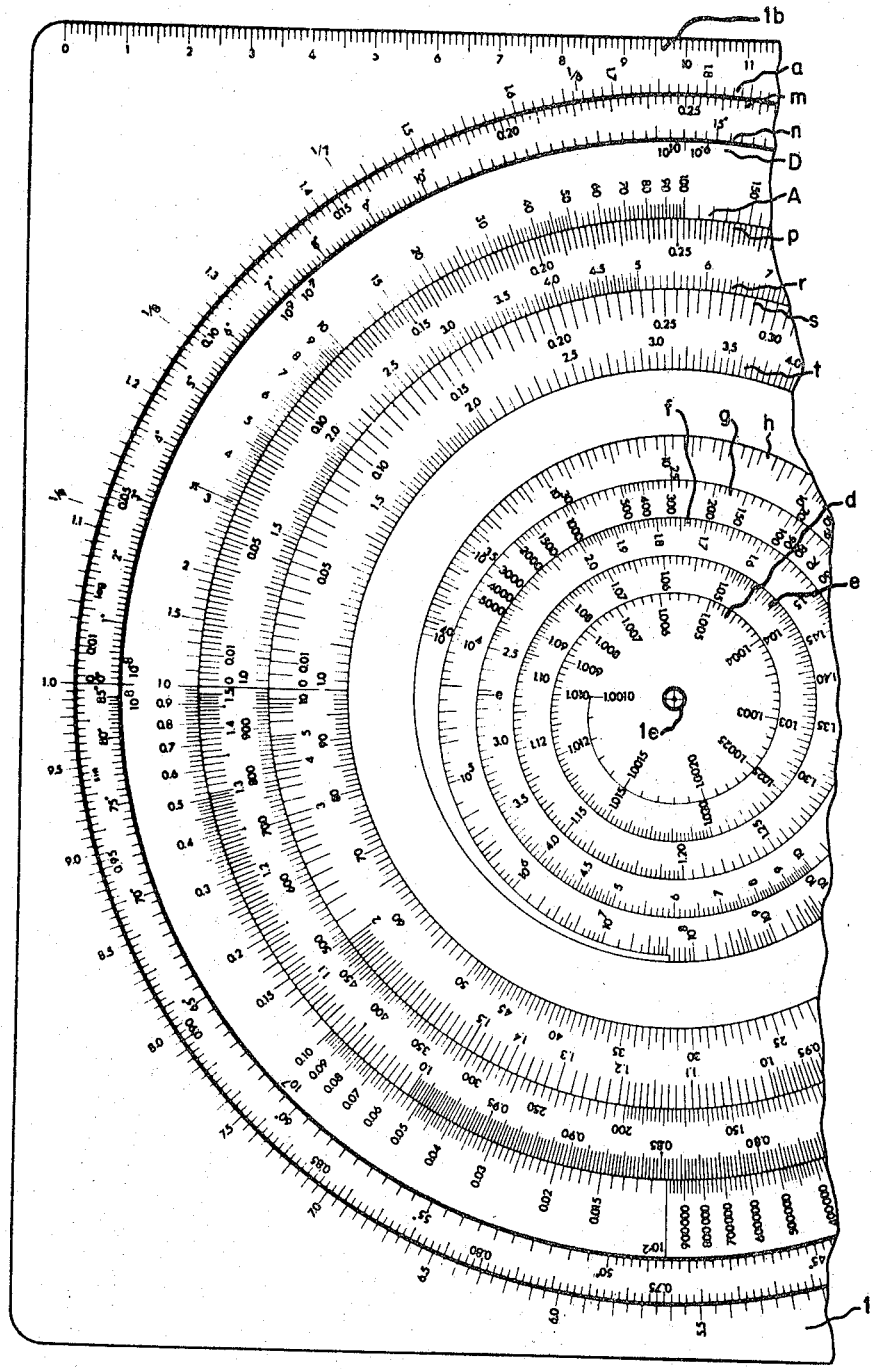
FIGURE 3 is a front view of the bottom plate belonging to the slide rule according to FIGURE 1.

The slide rule illustrated in the drawings comprises a bottom plate 1 which is provided with 9 circular scales concentrical to each other and symmetrically located on the bottom plate 1. Said scales as counted from the rim of the bottom plate 1, FIGURE 3, towards its center are designated $a$, $m$, $n$, D, A, $p$, $r$, $s$ and $t$.

The bottom plate 1 is also provided with a helical scale, said scale comprising five turns as illustrated in FIGURE 3, said five turns being designated $d$, $e$, $f$, $g$ and $h$. There is also, at one of the rims of the bottom plate 1, a scale 1$b$ gradated in millimeters or inches.

Figure 4:
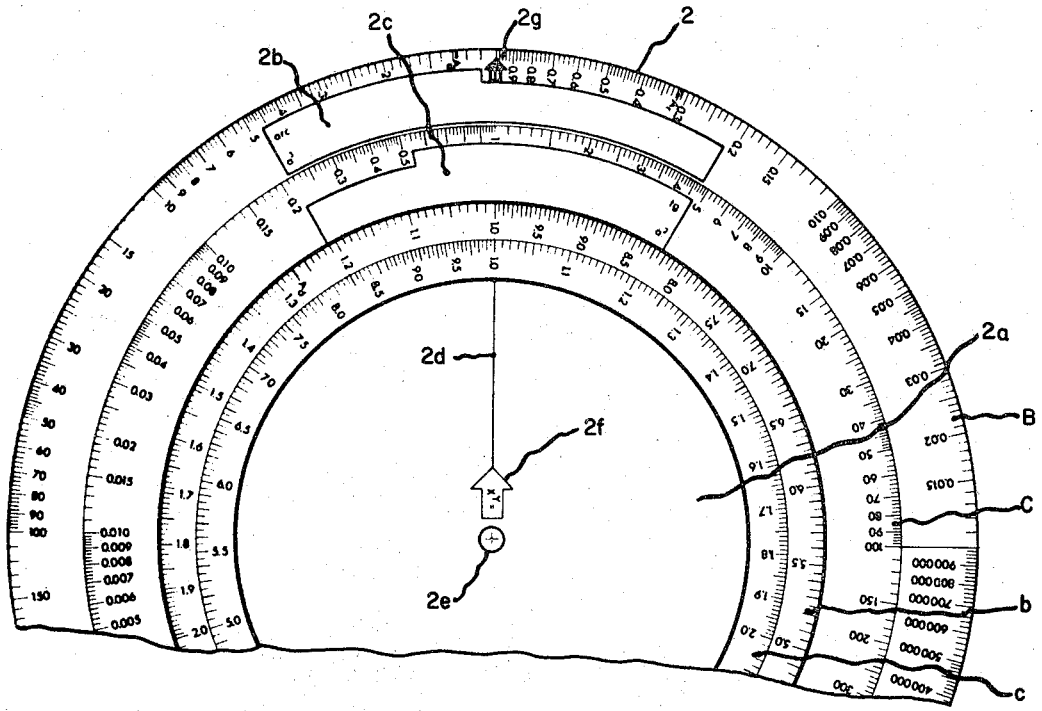
FIGURE 4 is a front view of a rotable slide belonging to the slide rule according to FIGURE 1.

The rotatable slide of the slide rule, which is illustrated in FIG. 4, is designated 2. It comprises 4 scales, all concentrical with each other. From the periphery of the slide 2 these scales are designated B, C, $b$ and $c$.

The area 2$a$ inside the scale $c$ is transparent in order to make the helical scale $d$ to $h$ of the bottom plate 1 visible when the slide FIG. 4 is mounted on the bottom plate, as illustrated in FIG. 1. There are also two transparent areas 2$b$ and 2$c$, respectively, in the slide 2, the area 2$b$ being provided in order to make the scales $p$ and $r$ of the bottom plate visible and the area 2$c$ being provided in order to make the scales $s$ and $t$ of the bottom plate visible.

The transparent area 2$a$ of the slide 2 is provided with an index line 2$d$ which extends from the center 2$e$ towards the numerical value 1 of the scale $b$ and $c$. Adjacent to the center 2$e$ the index line 2$d$ has the shape of an arrow 2$f$, said arrow being marked with the mathematical expression for a power such as $X^y$ and preferably also a sign of equality.

At the center of the bottom plate 1 there is an aperture 1$e$ and at the center of the slide 2 there is an aperture 2$e$, said apertures being intended to receive an axis for example in the shape of a tubular rivet, round which the slide 2 can rotate with respect to the bottom plate.

Figure 5:
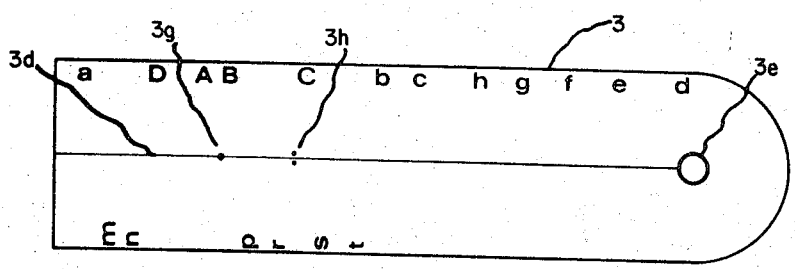
FIGURE 5 is a front view of a radial runner belonging to the slide rule according to FIGURE 1.

In FIG. 5 there is illustrated a runner 3 belonging to the slide rule. The runner 3 is provided, at one end thereof, with an aperture 3$e$ for mounting said runner on to the same axis as the slide 2, so as to be rotatable about said axis. As will be apparent from FIG. 1 and FIG. 2, the runner 3 extends radially from the center of the slide rule towards its periphery, and over all the scales which are provided on the bottom plate 1 as well as on slide 2.

The runner 3 is provided with an index line 3$d$ extending centrally from the aperture 3$e$ towards the other end of the runner. According to the present invention there are 2 mathematical signs on the runner, a multiplication mark 3$g$ in a form of a cross or a point, and a division sign 3$h$ in the form of two dots on said index line 3$d$ or adjacent to the latter.

As illustrated in FIG. 5 and as will be apparent from FIG. 1, the runner 3 is provided with markings for all the scales over which the runner extends, some of said markings being provided at one side of the index line 3$d$ and others of said markings being provided on the other side. By this means the markings are kept well apart from each other which makes it easier to distinguish said markings from each other and facilitates the handling of the device.

From FIG. 2 it is apparent how the slide 2 is rotatably mounted on to the bottom plate 1 and how the runner 3 is mounted on top of the slide 2, all these devices being held together by means of a tubular rivet 4.

As will be apparent from FIG. 3, the scale A has a logarithmical gradation with increasing numerical values in the clockwise direction, the gradation extending from 0.01 to 1,000,000 and being divided into 8 logarithmic decimal periods. The scale B of the slide 2, FIG. 4, has a corresponding gradation from 0.01 to 1,000,000 but in this case the increasing of the numerical values takes place in the counter clockwise direction. The scale C of the slide 2 has also a similar gradation and in this case the numerical values increase in the clockwise direction. As will be apparent from FIG. 1 the multiplication mark on the runner 3 is located to the right of the figures on scale A and just to the left of the figures on scale B on the slide 2. Correspondingly the division sign 3$h$ on said runner 3 is located just to the left of the figures on scale C on the slide 2.

The slide rule is to be handled as described in the examples below.

The scales A and B are to be used for multiplications:

When, for example, 3 is to be multiplied by 5, the slide rule is to be handled in the following manner: (3·5=).

The number 3 is to be found on the scale A on the bottom plate 1 and the runner 3 is turned so that its multiplication mark 3g will be located to the right of said number 3 and so that the runner hairline 3d is exactly indicating said number 3, thereafter the slide 2 is turned so that the number 5 on scale B will be located to the right of the multiplication mark 3g and so that the runner hairline is exactly indicating said number 5. The product, 15, is now visible on scale A opposite the index 2g on slide 2, said index having the shape of an arrow surrounding a sign of equality.

Similarly, when 0.03 is to be multiplied by 500,000 (0.03·500,000=) the number 0.03 is to be found on scale A and the slide 2 is turned so that the number 500,000 on scale B is to be located to the right of said number 0.03, the two numbers indicated by the runner hairline and having the multiplication mark between them. The product, 15,000, is visible on scale A opposite the index 2g with the sign of equality.

The scales A and C are to be used for divisions: When, for example, 30 is to be divided by 500 (30:500=), the slide rule is to be handled in the following manner.

The number 30 is to be found on scale A on the bottom plate 1 and the runner 3 is turned so that its hairline 3d is exactly indicating said number 30 and its division mark 3h will be located to the right of said number 30, thereafter the slide 2 is turned so that the number 500 on scale C will be located to the right of the said division mark so that the runner hairline is exactly indicating said number 500. The quotient, 0.06, is now visible on scale A opposite the index 2g on slide 2.

When repeated multiplications are to be made, for example 2 times 30 times 0.05 (2·30·0.05=), the slide rule is to be handled in the following manner.

The multiplication 2 times 30 is carried out as described above, thereafter the runner hairline is turned to indicate the index 2g and finally the slide 2 is turned so that the number 0.05 on scale B will be located to the right of the multiplication mark 3g and so that the runner hairline is exactly indicating said number 0.05. The product, 3, is now visible on scale A opposite index 2g.

The slide rule according to the invention may also be used for conveniently solving equations. If, for example, the equation 4·150=X·2000 should be solved in respect of X, the slide 2 is to be turned so that 150 on scale B comes horizontal with 4 on scale A. Then the value of X is readable on scale A horizontal with 2000 on scale B. The answer is 0.3. For facilitating the reading the hairline 3d on the runner 3 may be utilized.

When, for example, the equation 3:150=15:X is to be solved in respect of X, the slide 2 has to be turned so that 150 on scale C comes horizontal with 3 on scale A (whereby the runner hairline 3d must be utilized). Then the value of X is readable on scale C horizontal with 15 on scale A (and also in this case the runner hairline must be utilized). The answer is 750.

As apparent from the foregoing the results are obtained not only with correct digits but also with the correct magnitudes. The multiplication mark, 3g, the division mark, 3h, and the equality index, 2g, are employed to facilitate the slide rule operation.

The scales b and c on the slide 2 and the helical scale d–h on the bottom plate 1 are to be used as described below.

When, for example, 2 is to be taken to the 5th power ($2^5=$) the slide rule is to be handled in the following manner.

The base value 2 is to be found on the turn f of the helical scale on the bottom plate 1, the runner 3 is turned so that its hairline 3d is indicating said number 2, thereafter the slide 2 is turned so that the runner hairline is indicating also number 5, the exponent value, on the scale c on the slide 2. The result, 32, is now visible on turn g on the helical scale and is indicated by the hairline 2d, the hairline marked with an arrow 2f surrounding a mathematical expression for power, $X^y$.

It should be noted, that since the helical scale has 5 turns, the hairline 2d is indicating 5 power results at the same time.

The correct turn for a power result is given by the following rules:

If the exponent value is between 1 and 10, then the correct result is on that turn, which is indicated by the hairline 2d at the first value above the base value. And, if the exponent value is between 10 and 100, then the correct result is on that turn, which is indicated by the hairline 2d at the second value above the base value. And, if the exponent value is between 0.1 and 1.0, then the correct result is on that turn, which is indicated by the hairline 2d at the first value below the base value, etc.

When, for example, the 4th root of 625 is to be computed, the slide rule is to be handled in the following manner.

The value 625 is found on turn g of the helical scale on the bottom plate 1, the runner 3 is turned so that its hairline 3d is indicating said number 625, thereafter the slide 2 is turned so that the runner hairline is indicating also number 4, the 4th root, on scale b on the slide 2. The result, 5, is now visible on turn g of the helical scale and is indicated by the hairline 2.

As mentioned above, the hairline 2d is indicating 5 results at the same time.

The correct turn for root results is given by the following rules:

For the 1st to the 10th root, the correct result is on that turn, which is indicated by the hairline 2d at the first value below the base value. And, for the 10th to the 100th root, the correct result is on that turn, which is indicated by the hairline 2d at the second value below the base value. And, for the 0.1st to the 1.0th root, the correct result is on that turn, which is indicated by the hairline 2d at the first value above the base value, etc.

Also exponential equations could be solved by means of the device according to the invention. If, for example, the equation $2^5=10^x$ should be solved the value 2 is found on the turn f on the helical scale, and that value should be set opposite to the value 5 of the scale c, whereby the index line of the runner 3 should be utilized. Then, the runner should be turned, so that its index line is set just over the value 10 which is found on the turn g of the helical scale. The result 1.505 is now to be read on the scale c just under the index line 3d on the runner 3.

The slide rule according to the invention may also be used for computing the logarithms for different numbers. If the common logarithm should be computed, then scales a and m could be used, but by using the helical scales d–h in combination with the scale c the logarithm for any number with any wanted base can be found. If for example $^7\log 500$ should be computed, the runner is turned to the angle, where its index line 3d coincides with the logarithm base 7 on the scale g. Then the slide 2 is turned to an angle where its index line 2d coincides with the value 500 for which said logarithm is wanted, said value appearing also on scale g. During this operation, the runner is kept still where it was first set. Now, the logarithm value 3.19 is found on scale c under the index line 3d on the runner 3. If $^{10}\log 4$ should be computed, then the similar procedure can be used by turning the runner so that its index line coincides with the value 10 on the scale g, where the runner 3 should be kept still in place. Then the slide 2 should be turned to such an angle, that the index line 2d coincides with the value 4 on the scale g. Now, the logarithm for said value can be found under the index line of the runner 3 on the scale c (=0.602). But the common logarithm for any number can be found in a more simple way by utilizing the scales *a* and *m*. The runner 3 should be turned so that its index line 3*d* coincides with the value 4 on the scale *a*, the logarithm value 0.602 is directly readable under the index line on the scale *m*.

The sine value for any angle between 0° and 90° can be directly found by means of the scales *n* and *m*. If for example, sine 15° should be computed, the runner 3 has to be turned to an angle where its index line 3*d* coincides with 15° on the scale *n*. The value sine 15° can now be directly read on the scale *m* and is found to be 0.259. Correspondingly, the value tan 15° can be found by utilizing the scales *n* and *s*. The runner 3 is turned to an angle, where its index line coincides with the value 15° on the scale *n* and the value for tan 15° can now be read on the scale *s*, and is found to be 0.268. During this reading, the slide 2 has to turned to such an angle, that its aperture 2*c* makes the underlying scale visible.

If the arc value for the angle 15° should be computed, then the scales *n* and *p* are to be used. As before, the runner is set to such an angle, that its index line 3*d* coincides with the value 15° on the scale *n*, and the arc value for 15° (0.262), can now be read on the scale *p*. Also in this case, the slide 2 has to be turned to an angle where its aperture 2*b* makes the scale *p* visible. If the sine value for an angle should be found when the arc value is known, then scales *p* and *m* should be used. First, the slide 2 has to be turned to such an angle, that the arc value for example 0.45 rad. is visible through the aperture 2*b* on the scale *p*. Then the value for sine 0.45 rad. can be read directly on the scale *m* just under the index line of the runner when said index line has been set on the value 0.45 rad. on the scale *p* (0.435).

If the tan value for an angle is to be found and the arc value of the angle is known, then scales *p* and *s* are to be used. First the slide 2 has to be turned to such an angle, that the arc value, for example 1.30 rad., is visible through the aperture 2*b* on the scale *p*. Then the runner hairline 3*d* is turned to indicate said value 1.30 rad. and now the tan value is indicated by the runner hairline on scale *s* (3.60) through the aperture 2*c*.

If the area of a circular surface should be computed, the radius at which is known, then scales A and B should be used together with the mark $A_r$ on the scale B. If a circle has a radius of 15 centimetres, its area is $15 \times 15 \times \pi$. In that case, the value 15 on the scale B should be set opposite to the value 15 of the scale A, and then the area is directly readable on the scale A just opposite the mark $A_r$ on the scale B. The area is found to be 710 square centimetres. If the area of a circle should be computed, the diameter of which is known, the scales A and B should be used similarly, but now the marking $A_d$ on the scale B should be employed. If the diameter of such a circle is 30 centimetres, its area is $$\frac{30 \times 30 \times \pi}{4}$$

The value 30 on the scale B should be set opposite to the value 30 of the scale A and now the area of the circle can be read directly on the scale A opposite to the mark $A_d$ on the scale B.

The second and the third powers of any number can be easily found by utilizing the scales *a* and the scales *t* and *r*, respectively. If for instance the expression $3^2$ should be computed, the index line of the runner is set on the value 3 of the scale *a* and the power value which is 9 can now be read directly on the scale *t*, just under the index line. If the expression $3^3$ should be computed, the index line of the runner 3 is set to coincide with the value 3 of the scale *a* and the power value 27 is read directly on the scale *r* under said index line. In both of the last described examples the slide 2 should, of course, be turned to such an angle, that its apertures 2*b* and 2*c* respectively permits reading on the scales *t* and *r*.

By means of scales B and C the inverse value of different numbers may be computed in a simple way. If, for example, the value 1/800 should be computed, the index line 3*d* of the runner 3 is set to coincide with the value 800 of the scale B and the inverse value 0.00125 is found directly on the scale C.

If the inverted value should be computed with 3 to 4 digit accuracy, for instance the value 1/1.414, the scales *b* and *c* should be used. The runner 3 is set so that its index line 3*d* coincides with the value 1.414 on the scale *b* and now the inverse value 0.707 is readable directly on the scale *c*.

For the multiplication and division with 3 to 4 digits accuracy, the scales *a*, *b* and *c* may be utilized. If, for example, 1.22 should be multiplied by 1.58 the runner is set so that its index time coincides with the value 1.22 on the scale *a*. Then the slide 2 is turned so that the value 1.58 on the scale *b* coincides with the index line of the runner. Thereafter, the runner is turned so that its index line coincides with the arrow 2*g* on the slide 2. The wanted product 1.928 is now found on the scale *a* just under the index line of the runner. If, for example, 4.37/1.775 should be computed, the runner is set so that its index line 3*d* coincides with the value 4.37 on the scale *a*. Then the slide 2 is rotated so that the value 1.775 on the scale *c* coincides with the index line of the runner 3. Thereafter the runner 3 is rotated, so that its index line 3*d* coincides with the index 2*g* on the slide 2, and the result is readable from the scale *a* right under the index line of the runner. The result in this case is 2.46.

The calculations described above are just to be considered as examples, and of course, the slide rule according to the invention can be used for many other calculations than those described. The described examples are, however, to be considered to be typical for the utilization of the slide rule.

It should be noted, and it will be apparent from FIG. 5, that the markings on the upper side of the runner 3 illustrated in said figure are all readable in a radial direction and that the markings at the underside of the runner are readable in a tangential direction. This corresponds to the gradation of the scales which the markings represent. Thus the scales *a*, D, A, B, C, *b*, *c*, *h*, *g*, *f*, *e* and *d* are all readable in a radial direction while the scales *m*, *n*, *p*, *r*, *s* and *t* are all readable in a tangential direction. This makes it easier to find the correct scales and decreases the risk for making mistakes.

Modifications of the invention may be made within the scope of the appended claims.

We claim:

1. A slide rule device for solving problems involving the multiplication or division of numbers, and capable of simulating the conventional way such multiplication and division operations are written, said slide rule comprising a base plate having a first circular logarithmical scale thereon, a circular slide fixed to said base plate for rotation about an axis concentric with said scale and having thereon second and third radially spaced apart circular logarithmical scales concentric with the axis of rotation of said slide and disposed radially inwardly of said first scale, the numbers of said second scale on said slide increasing in the same direction as the numbers of said first scale on the base plate and the numbers of said third scale on said slide increasing in the opposite direction, the figures of all aforesaid scales being radially oriented and the number of decimal periods in all of the aforesaid scales being equal, a runner rotatable about the same axis as the slide and radially spanning all of said scales, said runner being of generally transparent material and having thereon radial index means, multiplication indication means disposed on said runner in the immediate vicinity of said radial index means and radially between said first and third scales whereby the numbers of said first and third scales radially aligning with said radial index means are oriented relative to said multiplication indication means in the same manner as the multiplication operation would be written, division indication means disposed on said runner in the immediate vicinity of said radial index means and radially between said first and second scales whereby the numbers of said first and second scales radially aligning with said radial index means are oriented relative to said division indication means in the same manner as the division operation would be written, and radial index means on said slide permanently coinciding in the radial direction with the numeral 1 of both the scales on said slide and terminating adjacent said first scale, the numbers and their associated decimal periods on said first and third scales being so correlated that the correct magnitude of the product of the numbers of said first and third scales aligning with the radial index means of said runner is the number on said first scale which radially aligns with the index means on said slide, and the numbers and their associated decimal periods on said first and second scales being so correlated that the correct magnitude of the quotient of the numbers of said first and second scales aligning with the index means on said runner is the number on said first scale which radially aligns with the index means on said slide.

2. The slide rule device of claim 1, together with means adapted to co-operate with said runner and including further logarithmic scales on said scale and a log-log scale on said base plate and visible through a central transparent circular portion of said slide and means providing an index on said slide for simultaneously ascertaining numerical sequences constituting powers and roots of numbers and the location of the decimal point in the sequences thus ascertained.

3. The slide rule device defined in claim 1 wherein said first scales and one of said second and third scales have substantially equal diameters with their graduations respectively extending in radially opposite directions from a common circumferential interface.

4. The slide rule device defined in claim 3 wherein said interface is defined by the outer peripheral edge of said slide.

5. A slide rule device for providing powers and roots of numbers and capable of simulating the conventional way of writing each operation comprising: a base plate having a helical log-log scale thereon, a circular slide rotatably fixed to said base plate, the portion of the slide overlying said log-log scale being transparent and said slide having two circular logarithmical scales thereon adjacent the periphery of said transparent area, one of said circular scales having increasing number values in the clockwise direction and covering one decimal period from 1 to 10 and the other circular scale having increasing number values in the counterclockwise direction and covering one decimal period from 1 to 10, the numeral 1 of both of said scales lying on the same radian through the axis of rotation, fixed radial index means on said slide coincident with said radian and spanning the helical scale, a runner rotatably pivoted to said base plate on the same axis as the slide, and index means on said runner extending radially from said axis of rotation and spanning said helical and logarithmic scales, a predetermined one of said circular scales, said log-log scale, and said index means on said runner and said slide so cooperating with each other that the correct magnitude of a base value raised to a given power is the number in a predetermined turn of said log-log scale that aligns with said index means on said slide when said runner and said slide are rotated to positions where the index means on said runner aligns with the number equal to said base value on said log-log scale and the number equal to said given power on said predetermined one of said circular scales, the other circular scale, said log-log scale, and said index means on said runner and said slide so co-operating with each other that the correct magnitude of a given root of a base value is the number in a predetermined turn of said log-log scale that aligns with the index means on said slide when said slide and said runner are rotated to positions where the index means on said runner aligns with the number equal to the base value on said log-log scale and with the number equal to said root on said other circular scale.

6. A slide rule device for solving problems involving the multiplication or division of numbers, and capable of simulating the conventional way such multiplication and division operations are written, said slide rule device consisting essentially of a base plate, a circular slide, a runner, and means mounting said slide and said runner for independent rotation about a common axis on said base plate, with said slide overlying said base plate and said runner overlying said slide, said base plate having a first circular logarithmical scale thereon which is concentric with said axis, said slide having second and third radially spaced apart circular logarithmical scales concentric with said axis and disposed radially inwardly of said first scale, the numbers of said second scale on said slide increasing in the same direction as the numbers of said first scale on said base plate and the numbers of said third scale on said slide increasing in the opposite direction, the figures of all the aforesaid scales being radially oriented and the number of decimal periods in all of the aforesaid scales being equal, said runner being of generally transparent material and having thereon radial index means, said runner further having multiplication indication means in the immediate vicinity of said radial index means and radially between said first and third scales whereby the numbers of said first and third scales radially aligning with said radial index means are oriented relative to said multiplication indication means in the same manner as the multiplication operation would be written, said runner further having division indication means in the immediate vicinity of said radial index means and radially between said first and second scales whereby the numbers of said first and second scales radially aligning with said radial index means are oriented relative to said division indication means in the same manner as the division operation would be written, said slide having radial index means permanently coinciding in the radial direction with the numeral 1 of said second and third scales and terminating adjacent said first scale, the numbers and their associated decimal periods on said first and third scales being so correlated that the correct magnitude of the product of the numbers of said first and third scales aligning with the radial index means of said runner is the number on said first scale which radially aligns with the index means on said slide, and the numbers and their associated decimal periods on said first and second scales being so correlated that the correct magnitude of the quotient of the numbers of said first and second scales aligning with the index means on said runner is the number on said first scale which radially aligns with the index means on said slide.

7. A slide rule device for providing powers and roots of numbers and capable of simulating the conventional way of writing each operation, said slide rule device consisting essentially of a base plate, a circular slide, a runner, and means mounting said slide and said runner for independent rotation about a common axis on said base plate, with said slide overlying said base plate and said runner overlying said slide, said base plate having a helical log-log scale thereon, said slide having a portion overlying said log-log scale and being transparent, said slide further having first and second circular logarithmical scales thereon adjacent to the periphery of said transparent portion, said first circular scales having increasing number values in the clockwise direction and covering one decimal period from 1 to 10 and said second circular scale having increasing number values in the counterclockwise direction and covering one decimal period from 1 to 10, the number 1 of both of said scales lying on the same radian through the axis of rotation of said slide and runner, said slide having fixed radial index means coincident with said radian and spanning said helical scale, said runner having index means extending radially from said axis of rotation and spanning said helical and logarithmic scales, a predetermined one of said circular scales, said log-log scale, and said index means on said runner and said slide so cooperating with each other that the correct magnitude of a base value raised to a given power is the number in a predetermined turn of said log-log scale that aligns with said index means on said slide when said runner and said slide are rotated to positions where the index means on said runner aligns with the number equal to said base value on said log-log scale and the number equal to said given power on said predetermined one of said circular scales, the other circular scale, said log-log scale, and said index means on said runner and said slide so cooperating with each other that the correct magnitude of a given root of a base value is the number in a predetermined turn of said log-log scale that aligns with the index means on said slide when said slide and said runner are rotated to positions where the index means on said runner aligns with the number equal to the base value on said log-log scale and with the number equal to said root on said other circular scale.

References Cited

UNITED STATES PATENTS

| | | | |
|---|---|---|---|
| 768,971 | 8/1904 | Anderson | 235—70 |
| 1,042,755 | 10/1912 | Beckett | 235—84 |
| 1,918,188 | 7/1933 | Luckey | 235—84 |
| 2,394,563 | 2/1946 | Purcell | 235—84 |
| 2,426,362 | 8/1947 | MacDonald | 235—84 |
| 2,468,582 | 4/1949 | Willard | 235—84 |

RICHARD B. WILKINSON, *Primary Examiner.*

S. A. WAL, *Assistant Examiner.*

UNITED STATES PATENT OFFICE
CERTIFICATE OF CORRECTION

Patent No. 3,374,947  
March 26, 1968

Carl Rune Wern et al.

It is certified that error appears in the above identified patent and that said Letters Patent are hereby corrected as shown below:

Column 6, line 14, "time" should read -- line --. Column 7, line 25, "scale", second occurrence, should read -- slide --.

Signed and sealed this 5th day of August 1969.

(SEAL)  
Attest:

Edward M. Fletcher, Jr.  
Attesting Officer

WILLIAM E. SCHUYLER, JR.  
Commissioner of Patents